United States Patent
Shin et al.

(10) Patent No.: US 9,380,548 B2
(45) Date of Patent: Jun. 28, 2016

(54) CLUSTERING APPARATUS AND METHOD FOR CONTROLLING TIMING

(75) Inventors: Jun Hyo Shin, Seoul (KR); Jung Hoon Kim, Gunpo-si (KR)

(73) Assignee: ERICSSON-LG CO., LTD., Seoul (KR)

( * ) Notice: Subject to any disclaimer, the term of this patent is extended or adjusted under 35 U.S.C. 154(b) by 174 days.

(21) Appl. No.: 14/115,424

(22) PCT Filed: Dec. 23, 2011

(86) PCT No.: PCT/KR2011/010062
§ 371 (c)(1),
(2), (4) Date: Nov. 4, 2013

(87) PCT Pub. No.: WO2012/161398
PCT Pub. Date: Nov. 29, 2012

(65) Prior Publication Data
US 2014/0078957 A1    Mar. 20, 2014

(30) Foreign Application Priority Data

May 20, 2011 (KR) ......................... 10-2011-0047825
Oct. 10, 2011 (KR) ......................... 10-2011-0103087

(51) Int. Cl.
*H04W 56/00* (2009.01)
*H04J 3/06* (2006.01)
(Continued)

(52) U.S. Cl.
CPC ......... *H04W 56/0065* (2013.01); *H04J 3/0641* (2013.01); *H04L 41/0893* (2013.01); *H04J 3/0644* (2013.01); *H04J 3/0658* (2013.01);
(Continued)

(58) Field of Classification Search
CPC .... H04W 56/00; H04L 12/46; H04L 43/0858
USPC ........................................................... 370/326
See application file for complete search history.

(56) References Cited

U.S. PATENT DOCUMENTS

| 2003/0172179 A1 | 9/2003 | del Prado Pavon et al. .. 709/236 |
| 2003/0221138 A1 | 11/2003 | Shirakawa .................... 713/400 |

(Continued)

FOREIGN PATENT DOCUMENTS

| JP | 2004-112667 A | 4/2004 |
| KR | 10-2008-0045325 A | 5/2008 |

(Continued)

OTHER PUBLICATIONS

"Femtocell synchronization and location, a femto forum topic brief" Jun. 1, 2010, pp. 1-22.*

(Continued)

*Primary Examiner* — Ian N Moore
*Assistant Examiner* — Mewale Ambaye
(74) *Attorney, Agent, or Firm* — Ked & Associates, LLP

(57) ABSTRACT

A clustering apparatus and method that can be used when synchronizing phase and frequency using a hybrid system of network assisted global navigation satellite system (AGNSS) and timing packet. A clustering apparatus for controlling timing is to determine a best master having a higher master-slave quality level among potential masters that can provide a timing packet based on a neighbor list provided by a server. The clustering apparatus organizes a cluster having linkability between the best master and at least one slave. The clustering apparatus performs synchronization between the best master and said at least one slave for each cluster.

10 Claims, 5 Drawing Sheets

(51) Int. Cl.
*H04L 12/24* (2006.01)
*H04L 12/26* (2006.01)

(52) U.S. Cl.
CPC .......... *H04L43/0858* (2013.01); *H04L 43/106* (2013.01); *H04W 56/0015* (2013.01)

(56) References Cited

U.S. PATENT DOCUMENTS

| | | | |
|---|---|---|---|
| 2007/0002987 A1 | 1/2007 | Sinha et al. | 375/354 |
| 2010/0103781 A1* | 4/2010 | Rai et al. | 368/55 |
| 2010/0220692 A1 | 9/2010 | Diab et al. | |
| 2010/0245172 A1 | 9/2010 | Gottifredi et al. | 342/357.51 |
| 2012/0195253 A1* | 8/2012 | Irvine | 370/328 |

FOREIGN PATENT DOCUMENTS

| | | | |
|---|---|---|---|
| KR | 10-2010-0114350 A | | 10/2010 |
| WO | WO 2009/077512 | * | 6/2009 |
| WO | WO 2009/077512 A1 | | 6/2009 |

OTHER PUBLICATIONS

International Search Report dated Jun. 29, 2012 issued in Application No. PCT/KR2011/010062.
Korean Notice of Allowance dated Feb. 22, 2013 issued in Application No. 10-2011-0103087.
European Search Report dated Nov. 28, 2014 issued in application No. 11866227.9.
N.N.: "Femtocell synchronization and location, a Femto Forum topic brief", Femto Forum Whitepapers, vol. 1, No. 15, Jun. 1, 2010, pp. 1-22, XP009162395, Retrieved from the Internet: URL:http://www.ittelkom.ac.id/staf/miq/Subject/WBC/WBCJuni%202011/16.sec.%20net%20border_Bayu%20Aria_211110001/referensi/015+Femt+Forum+Femtocell+Synchronization+and+Location.pdf.
Kenneth Hann Tellabs Oy Finland: "Model of BMCA in slave; WD80", ITU-T Draft; Study Period 2009-2012, International Telecommunication Union, Geneva; CH, vol. 13, Apr. 11, 2011, pp. 1-2, XP017569461, [retrieved on Apr. 11, 2011] *the whole document*.
Kim Ry et al: "WiMAX femtocell: requirements, challenges, and solutions", IEE Communications Magazine, IEEE Service Center, Piscataway, US, vol. 47, No. 9, Sep. 1, 2009, pp. 84-91, XP011283369, ISSN: 0163-6804, DOI: 10.1109/MCOM.2009.5277460.

* cited by examiner

CLUSTERING APPARATUS AND METHOD FOR CONTROLLING TIMING

CROSS-REFERENCE TO RELATED PATENT APPLICATIONS

This application is a U.S. National Stage Application under 35 U.S.C. §371 of PCT Application No. PCT/KR2011/010062, filed Dec. 23, 2011, which claims priority of Korean Patent Application Nos. 10-2011-0047825, filed on May 20, 2011 and 10-2011-0103087 filed Oct. 10, 2011.

TECHNICAL FIELD

The present invention relates to the field of mobile communications, and more particularly, to a clustering apparatus and method that can be used when synchronizing phase and frequency using a network assisted global navigation satellite system (AGNSS) and a timing packet hybrid system.

BACKGROUND ART

Clustering refers to configuring entities having a similarity among a number of entities of a group called a cluster. Therefore, a level indicating similarity among respective entities is needed in order to configure a cluster and a similarity between two entities i and j is generally expressed as a distance (i, j). However, in a packet timing standard such as current packet time protocol (PTP) or network time protocol (NTP), only a method for synchronization between master and slave is described, but a method for configuring a cluster between master and slave is not described.

When synchronizing phase and frequency in a small cell including a femtocell by using a network assisted global navigation satellite system (AGNSS), the intensity of a signal transmitted from the AGNSS may be different according to the environment where the small cell is located. It may not be possible to secure a line of sight (LOS) in severe cases. If the intensity of the signal is low the accuracy of synchronized time may also become low. Another problem is that when a small cell is located in indoors, the possibility of increasing the accuracy becomes low.

When synchronizing phase and frequency in the small cell by using a timing packet, packet delay variation (PDV) is largely increased according to queuing delay, network overload, network congestion, temporary network blocking or the like caused by router and switch based on a backhaul network connected to the small cell, and this reduces phase and frequency synchronization quality of the slave or fails to establish synchronization in severe cases.

In the conventional master-slave structures using a timing packet, the roles of the maser and slave are fixed. This causes a problem since the number of slaves is limited depending on the capacity of the master. The PDV is also increased due to consideration of the master's location and timing packet convergence as multiple slaves converge on one master.

In a fixed type of master-slave structure, the distance over a network between the master and slave changes. The measure of dispersion for this is large (the network distance is increased when the number of routers or switches becomes large). This makes it difficult for a slave having a large network distance to be synchronized with a master in phase and frequency.

When using a synchronizing method using a pilot channel and a synchronization channel of a neighbor cell (macro cell or small cell), since the neighbor cell should be within a certain distance to receive a radio wave that can reach the neighbor cell, there is a problem in that a synchronization reference cannot be obtained due to the absence of a neighbor cell when a small cell is positioned to improve the shadow area for coverage expansion.

DISCLOSURE OF INVENTION

Technical Problem

The present invention generally relates to a clustering apparatus and method that can be used when synchronizing phase and frequency using a network assisted global navigation satellite system (AGNSS) and a timing packet hybrid system.

Solution to Problem

An embodiment for controlling timing by using clustering apparatus is disclosed herein. In one embodiment, by way of non-limiting example, there is a clustering apparatus for controlling timing, wherein the clustering apparatus is configured to determine a best master having a higher master-slave quality level among potential masters that can provide a timing packet based on a neighbor list provided by a server, organize a cluster having linkability between the best master and at least one slave, and perform synchronization between the best master and said at least one slave for each cluster.

In another embodiment, a clustering method for controlling timing includes: receiving a neighbor list regarding potential master information for providing a timing packet from a server; determining a best master having a higher master-slave quality level based on the neighbor list and organizing a cluster having linkability between the best master and at least one slave; and performing synchronization between the best master and said at least one slave for each cluster.

Advantageous Effects of Invention

According to the present invention, when a cluster is configured between the master and slave in order to synchronize the phase and frequency using the AGNSS and timing packet scheme, a condition to be a master and a level for master's accuracy are suggested by providing a method for determining an MQL. The master and slave can organize a cluster by allowing the server to determine a neighbor list and transfer it to each slave. A method for reducing the load is suggested by providing a method for enabling each slave to determine a master having the best quality. In order that the load is not focused on a specific mater, a weight is applied to the master's quality level and the NQL determined by the PDV. By applying the weight to the master's quality level and the NQL, a balanced clustering can be obtained. After organizing the cluster, each cluster autonomously determines and suggests the method for organizing a cluster, thereby reducing the load of the server.

MODE FOR THE INVENTION

Hereinafter, embodiments of the present invention will be described in detail with reference to the attached drawings. However, in the following description, well-known functions or constitutions will not be described in detail if they would obscure the invention in unnecessary detail.

The present invention is directed to a method for efficiently configuring a cluster by selecting a master having good quality in a master-slave structure. In some instances there is a desire to synchronize frequency and phase by using a hybrid apparatus of a network assisted global navigation satellite system (AGNSS) and a timing packet (packet time protocol (PTP)) or network time protocol (NTP)). Precise synchronization of the frequency and phase of a mobile communication base station that uses a public network and is located indoors like a small cell can be accomplished using a public network.

Since the small cell is installed indoors in a home, office or the like, an AGNSS antenna has to secure a sufficient line of sight in order to receive signals from the AGNSS for synchronization, and this makes it difficult to synchronize phase and frequency using the AGNSS.

Further, since a backhaul is connected to the public network in the small cell, a packet delay variation (PDV) occurring in a network is variable depending on the network where the small cell is located. Thus, in the case of PTP and NTP, which are schemes for carrying and sending timing information on packet, it is difficult to synchronize phase and frequency.

An AGNSS-timing packet hybrid apparatus in which the AGNSS and the timing packet scheme are mixed can have two states of master or slave based on reception quality and clock quality of an AGNSS signal that is received in each apparatus, and the state of master or slave is not fixed but variable since the reception quality and clock quality of the AGNSS signal are variable with time.

The reception quality of the AGNSS signal is indicated as one quality level (QL) by combining the number of receivable AGNSS satellites, the strength of the signal received from the AGNSS satellite, and the number of satellites whose signal strength is higher than a reference signal strength. As one embodiment, when the quality level of the reception quality of the AGNSS signal is smaller than a threshold value, the small cell operates as a master, and when it is greater than the threshold value, the small cell operates as a slave. This quality level is defined as a master's quality level (MQL), and the master transfers the master's quality level to the slave so that the slave can select a master having a high quality level.

Figure 1:
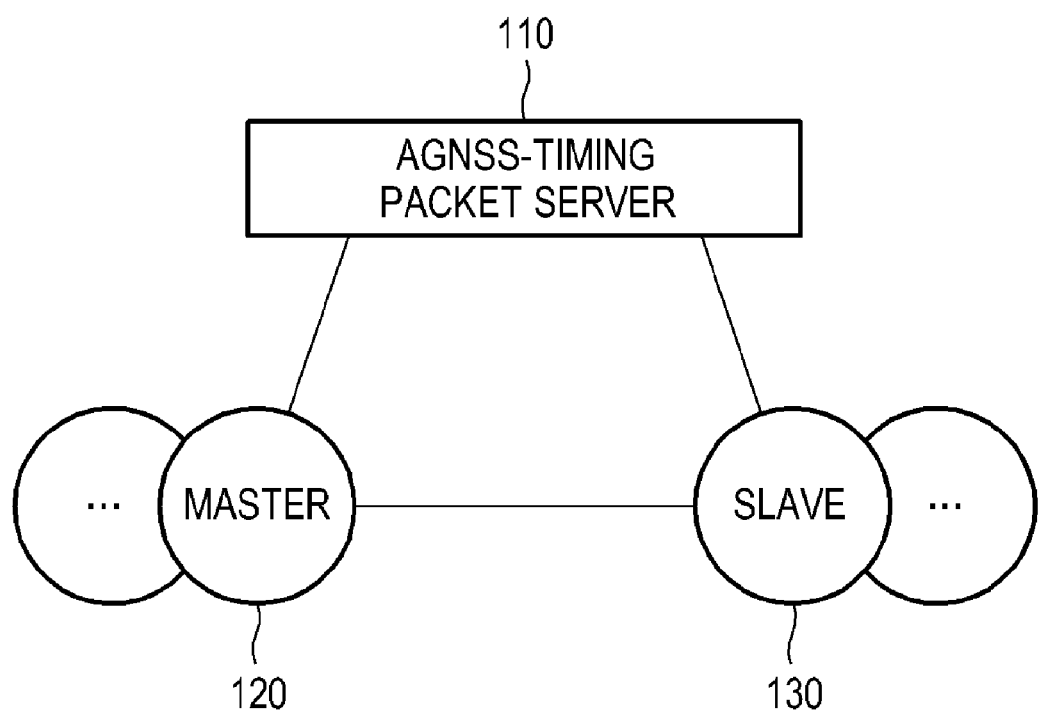
FIG. 1 is a block diagram illustrating a configuration of a clustering apparatus according to an embodiment of the present invention.

FIG. 1 is a block diagram illustrating a configuration of a clustering apparatus according to an embodiment of the present invention. Referring to FIG. 1, the clustering apparatus includes an AGNSS-timing packet server 110, at least one master 120, and at least one slave 130.

The AGNSS-timing packet server 110 generates a necessary neighbor list to configure a cluster using information (for example, position information, network information, capacity of master, etc.) received from an individual master 120. A role of the AGNSS-timing packet server 110 may be performed in a server for managing cells or base stations and in a separate server for managing the AGNSS-timing packet hybrid apparatus.

The slave 130 can calculate a network's quality level (NQL) with respect to a network between the master 120 and the slave 130 by measuring PDV of the master 120 included in the neighbor list.

The AGNSS-timing packet hybrid apparatus has the following features.

A small cell that is synchronized with the AGNSS and can independently establish synchronization without any external synchronization reference except for the AGNSS can be linked to the slave 130, and is set as the master 120 for the slave 130. When it is only possible to make synchronization by an external timing packet since it is unable to receive the AGNSS signal, the small cell is set as the slave 130.

The AGNSS-timing packet server 110 supplies the neighbor list to each small cell such that the cluster is configured using the neighbor list. The neighbor list includes information required for the slave 130 to determine a best master using potential master information. A potential master is a master that can provide timing packet information for the slave 130. When configuring the cluster, the AGNSS and quality level of the timing packet can be used for easy configuration thereof.

Master-Slave Quality Level

A quality level is needed between the master and the slave so that the slave 130 can determine which master that has the best quality, and the definition for this is as follows:

1. Master's Quality Level

A master's quality level that is determined by an AGNSS quality level of the master 120 is generated and determined by combining factors that affect the synchronization quality through the AGNSS of the master 120 such as the number of AGNSS satellites receivable by the master 120, the strength of the signal received from the AGNSS satellites, the number of the satellites whose signal strength is higher than the reference signal strength, or the like.

2. Network's Quality Level

A timing packet quality from the master 120 indicates PDV quality of the timing packet transferred through a network, which is determined by filtering effective packets among the timing packets obtained for a predetermined period of time, converting the effective packets into statistic levels, and converting the statistic levels into levels.

Using a master-slave quality level that is a new quality level obtained by combining quality levels of the master and the network, the slave 130 and AGNSS-timing packet server 110 can identify the quality of the master 120, and accordingly, it is possible to obtain an efficient clustering.

At this time, the AGNSS-timing packet server 110 provides the neighbor list to configure the cluster, and the slave 130 determines the level of the potential master using the quality level and then determines a master having the highest level as the best master.

A method in which the slave 130 determines the master-slave quality level using the quality level (QL) is as follows. At this time, while the final master-slave quality level is determined by adding a master quality level determined by the AGNSS quality of the master 120 and a network quality level determined from a PDV quality of the timing packet transferred from the master 120, a master having the highest master-slave quality level is determined as the best master. The master-slave quality level can be calculated by using Eq. (1) shown below:

$$\text{Master-slave quality level} = \text{master's quality level} \\ (MQL) + \text{network's quality level } (NQL) \qquad \text{Eq. (1)}$$

When the determined best master is not available, the slave 130 determines a master having the next priority (that is, the master of the master-slave quality level having the next priority) as the best master, thereby enabling a continuous synchronization acquisition.

Quality Level-Weighted Clustering Method

When the AGNSS-timing packet server 110 configures the cluster, a method for dispersing intensive clustering of the slave 130 to a specific master by giving weight although the best master was determined, is additionally considered.

Figure 2:
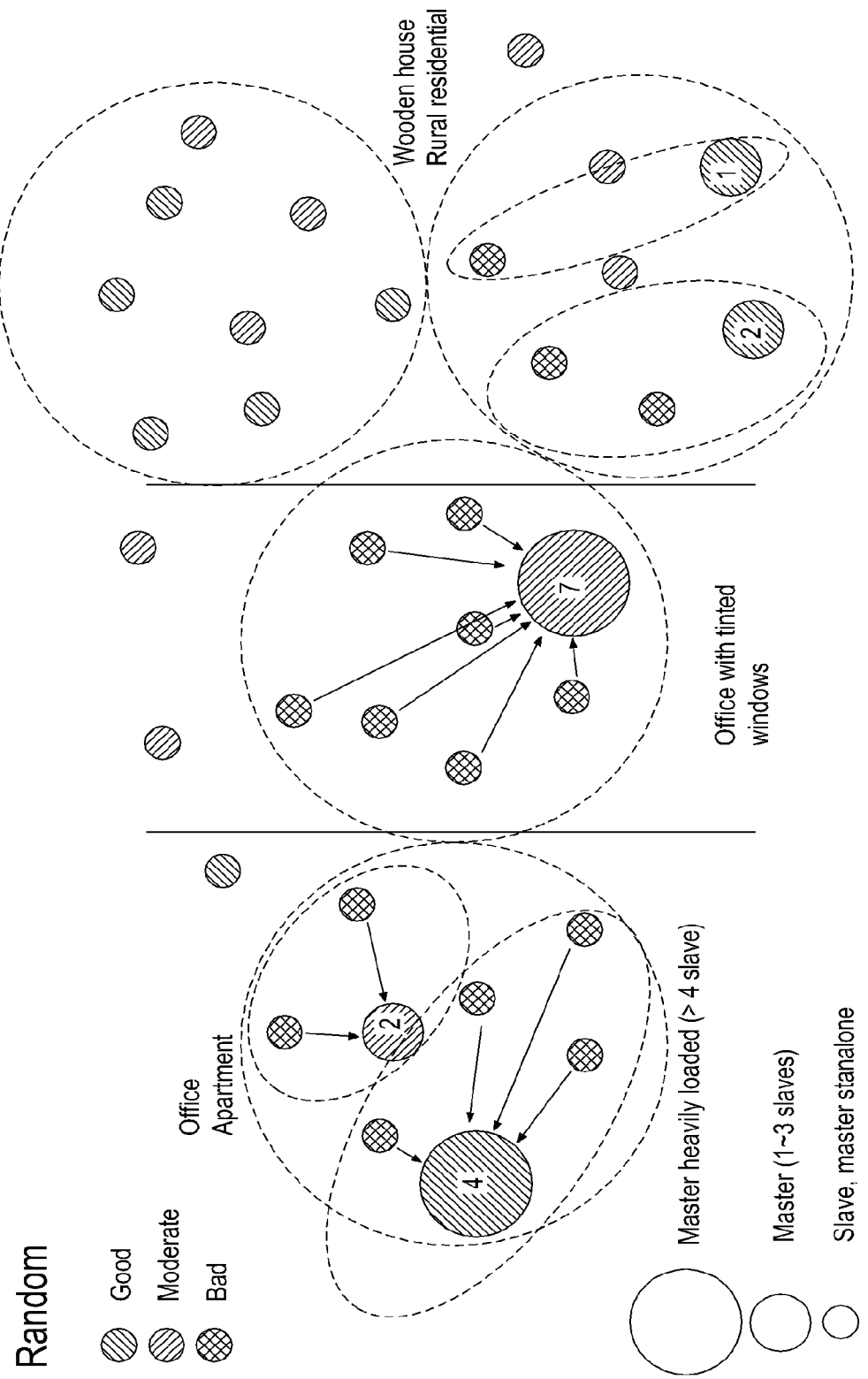
FIGS. 2 and 3 are exemplary views illustrating a clustering according to an embodiment of the present invention.
Figure 3:
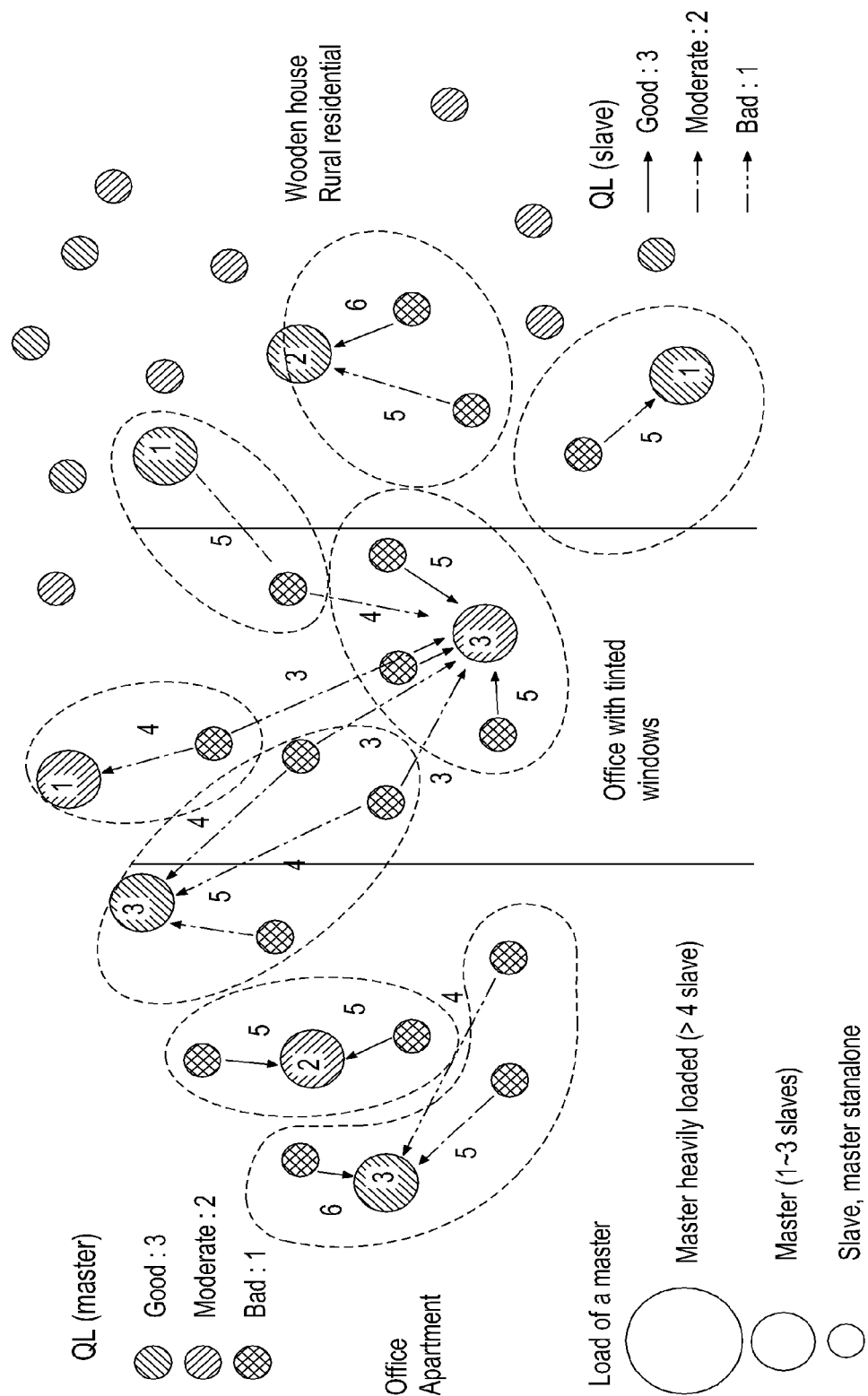

FIGS. 2 and 3 are exemplary views illustrating a clustering according to an embodiment of the present invention. Referring to FIG. 2, there may be a case in which a certain number of slaves 130 are arbitrarily defined and configured as one cluster. In this case, the slave 130 may be clustered to a specific cluster. This is because a possible number of masters and their qualities are not considered when configuring the cluster. In some cases, there may be a case in which no master exists in the cluster, so it fails to configure a cluster in which synchronization is independently kept. Thus, the AGNSS-timing packet server 110 notifies an arbitrary slave of information of a master located within a predetermined distance from the slave when notifying the slave of a neighbor list, so that the slave can determine the quality and then select the master.

In this case, the slave has a higher probability of obtaining a potential master compared with the method for arbitrarily configuring a cluster without giving a weight. Subsequently, the slave obtains a timing packet from the potential master and determines a PDV quality level that reflects a network quality between the master and the slave. While the final selection of the best master is determined by combining the master's quality level and the network's quality level as described above, the quality level of the potential master is determined by applying the weight that reflects an influence level of the master's quality level and the network's quality level. The quality level of the potential master can be calculated by using the following Eq. (2):

Potential master-slave quality level=first weight×master's quality level+second weight×network's quality level  Eq. (2)

The first and second weights in Eq. (2) are weights that are measured and evaluated in an actual usage environment using a unique algorithm. The first and second weights are calculated by comprehensively considering the amount of change in the AGNSS quality of the master, information on the amount of change in the PDV quality of the timing packet from a specific potential master measured in the slave, an AGNSS lock duration of the potential master, a ratio of the timing packet, or the like.

The determination of the quality level using the weight can obtain a disperse effect (primary disperse effect) where the slaves do not concentrate on a specific master as illustrated in FIG. 3. Apart from this, when several quality levels of potential masters exist, the quality levels being the highest values and the same quality levels, a potential master that has a small load is finally determined as the best master by comparing the slaves that are dependent upon the potential masters. By doing so, it is possible to finally obtain a disperse effect of the master (secondary disperse effect).

The PDV between the master and the slave can be normally measured and determined by the time deviation (TDEV) of a packet, maximum time interval error (MTIE), maximum average frequency error (MAFE), field work performance report (FWPR), or level using a corresponding statistic method.

Role of AGNSS-Timing Packet Server

The AGNSS-timing packet server 110 needs to generate the neighbor list in order to enable clustering between the master 120 and the slave 130, and to this end, the master 120 has to provide the AGNSS-timing packet server 110 with information such as a master's position information, a master's femtocell ID, a master's femtocell gateway IP address, a master's femtocell IP address, a master's AGNSS quality, a master's clock quality, the number of slaves to which a master provides timing information, a master's NAT/firewall type & user datagram protocol (UDP) port number, and the like. Further, the slave 130 has to provide the AGNSS-timing packet server 110 with information such as a slave's position information, a slave's femtocell ID, a slave's femtocell gateway IP address, a slave's femtocell IP address, a slave's NAT/firewall type & UDP port number, and the like.

Figure 4:
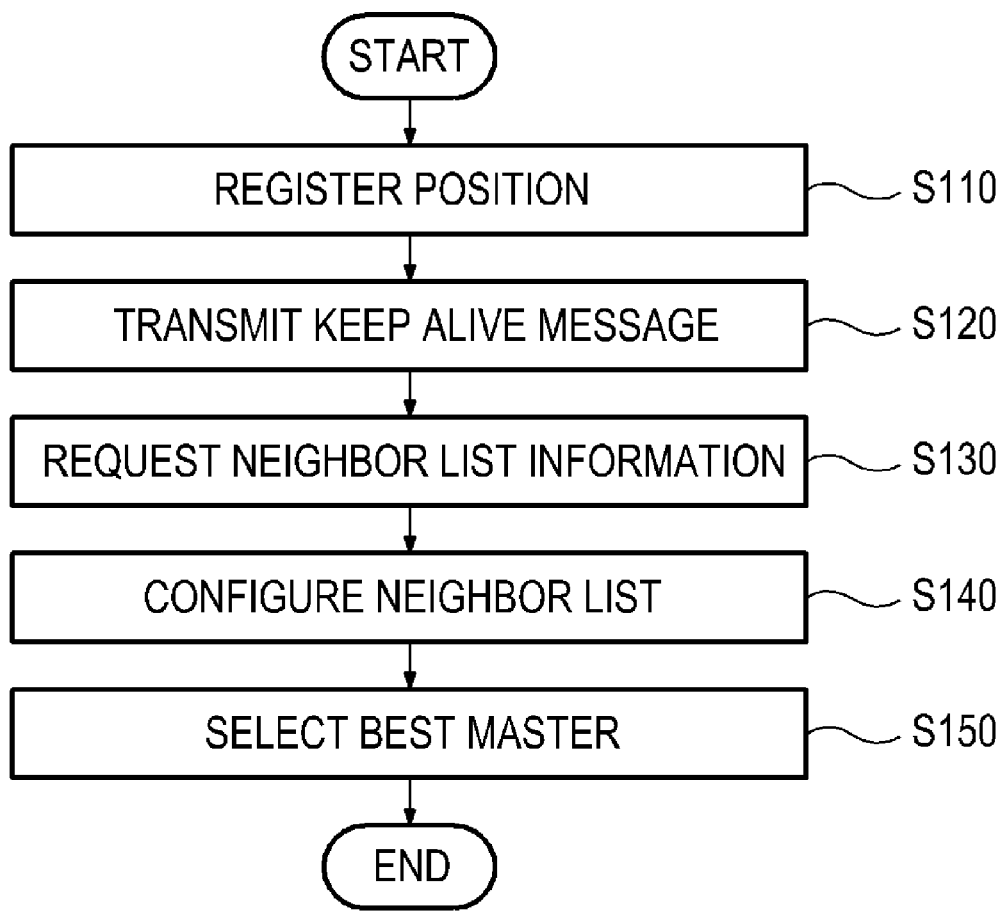
FIG. 4 is a flow chart illustrating a procedure for generating a neighbor list by the AGNSS-timing packet server 110 according to an embodiment of the present invention.

FIG. 4 is a flow chart illustrating a procedure for generating a neighbor list by the AGNSS-timing packet server 110 according to an embodiment of the present invention.

Referring to FIG. 4, the master 120 registers its own position information in the AGNSS-timing packet server 110 (S110).

The master 120 periodically transmits a keep-alive message to the AGNSS-timing packet server 110 (S120). As one embodiment, the keep-alive message includes information such as the master's position information, the master's femtocell ID, the master's femtocell gateway IP address, the master's femtocell IP address, the master's AGNSS quality, the master's clock quality, the number of slaves to which the master provides timing information, the master's NAT/firewall type & UDP port number, and the like.

The individual slave 130 requests the AGNSS-timing packet server 110 for information regarding the neighbor list (S130). Here, the requested message includes information such as the slave's position information (for example, position information when it was the master), the slave's femtocell ID, the slave's femtocell gateway IP address, the slave's femtocell IP address, the slave's NAT/firewall type & UDP port number, and the like.

The AGNSS-timing packet server 110 forms the neighbor list based on the information received from the master 120 and the slave 130 (S140).

As one embodiment, a method for generating the neighbor list is as follows.

1) Selecting a master closer to an individual slave in location.
2) Selecting it in consideration of a master's capacity.
3) Selecting the master in the reverse order of AGNSS quality.
4) The AGNSS-timing packet server can make a femtocell available under an NAT/firewall environment using an STUN function (see RFC 5389).

In the method for selecting the master closer to the individual slave in position, the selection is made in sequential consideration of factors such as master's physical position (location information), a zip code of femtocell, using the same gateway, and femtocell IP address (using longest pre-fix matching).

Further, in the procedure for making the femtocell available under the NAT/firewall environment, an individual master and slave try to make a communication specified in RFC 5389, the AGNSS-timing packet server determines whether the individual master and slave are under the NAT/firewall environment and the type of NAT/firewall environment under which they are placed and transfers the determination result to the slave. Also, when preparing a neighbor list, it may include information regarding the NAT/firewall.

Process in which the Slave Selects the Best Master to Realize the Cluster

Figure 5:
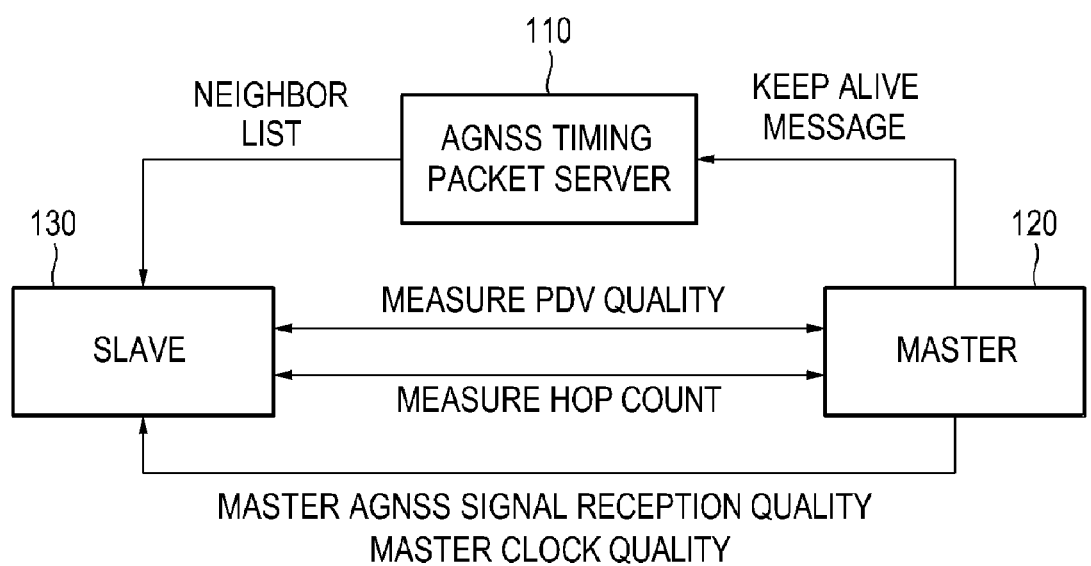
FIG. 5 is an exemplary views illustrating a transmitting and receiving of signals according to an embodiment of the present invention.

The slave needs to select the best master to realize the master with the best quality and the cluster (S150). For this, the slave 130 receives information regarding the neighbor list (potential masters) from the AGNSS-timing packet server 110 as illustrated in FIG. 5. The master's quality level is determined by the AGNSS quality of the potential master and the network's quality level. The network quality is determined by the PDV quality of the timing packet between the potential master and slave. The potential master has a higher probability of being the best quality and is determined to be the best master by calculating the master-slave quality level with a weight given to the master's quality level and the network's quality level.

Closest Neighbor Master Discovery Method after Configuring the Cluster

When a cluster is configured, the closest neighbor master discovery method can be performed to find a closest master in the cluster. Thus, finding a master that is closest to a specific slave in terms of a network distance can be accomplished using a simple method. Without providing a direct link (namely, without measuring a timing packet PDV QL180), a network's quality level can be calculated using a timing packet PDV quality level that is expected after the link as follows.

1) Each slave in the cluster measures PDV with the master and calculates the network's quality level.
2) The measured network's quality level is transferred to the master.
3) The master transfers network information of all slaves to each slave.
4) Each slave can identify the slave having the best network's quality level to its own slave using triangle inequality.

In one embodiment since it can be said that a network's quality level of between slave 1 and slave 2 is less than 100+130 and a network's quality level of between slave 1 and slave 3 is less than 100+150 in the triangle inequality, when the network's quality level of between slave 1 and master is 100, a network's quality level of between slave 2 and master is 130, and a network's quality level of between slave 3 and master is 150, it can be determined that there is a high probability that the slave closest to the slave 1 is slave 2.

This has an effect to reduce the CPU load consumed to calculate the network's quality level, by making the closest slave identified without measuring the network's quality level between slaves. When the slave is switched to a state that an AGNSS signal can be received (potential master available condition), there is an effect that the potential master-slave's quality level can be calculated by using only the master's quality level and the AGNSS quality level.

According to the present invention, when a cluster is configured between the master and slave in order to synchronize the phase and frequency using the AGNSS and timing packet scheme, a condition to be a master and a level for master's accuracy are suggested by providing a method for determining an MQL. The master and slave can organize a cluster by allowing the server to determine a neighbor list and transfer it to each slave. A method for reducing the load is suggested by providing a method for enabling each slave to determine a master having the best quality. In order that the load is not focused on a specific mater, a weight is applied to the master's quality level and the NQL determined by the PDV. By applying the weight to the master's quality level and the NQL, a balanced clustering can be obtained. After organizing the cluster, each cluster autonomously determines and suggests the method for organizing a cluster, thereby reducing the load of the server.

While the foregoing methods have been described with respect to particular embodiments, these methods may also be implemented as computer-readable codes on a computer-readable recording medium. The computer-readable recoding medium includes any kind of data storage devices that can be read by a computer system. Examples of the computer-readable recording medium include ROM, RAM, CD-ROM, magnetic tape, floppy disk, optical data storage device and the like, and also include that implemented in the form of a carrier wave (e.g., transmission via Internet). Also, the computer-readable recoding medium can be distributed to the computer systems which are connected through a network so that the computer-readable codes can be used and executed thereon. Further, the functional programs, codes, and code segments for implementing the foregoing embodiments can easily be inferred by the programmers in the art to which the present invention pertains.

While certain embodiments have been described, these embodiments have been presented by way of example only, and are not intended to limit the scope of the invention. Indeed, the novel methods and apparatuses described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

The invention claimed is:

1. A clustering apparatus for controlling timing, comprising:
    a receiver configured to receive a neighbor list regarding potential master information for providing a timing packet from a server; and
    a processor configured to determine a best master having a higher master-slave quality level among potential masters that provides a timing packet based on the neighbor list, organize a cluster having linkability between the best master and at least one slave, and perform synchronization between the best master and said at least one slave for each cluster,
    wherein the master-slave quality level includes a master's quality level that is determined by a network assisted global navigation satellite system (AGNSS) quality information of the potential masters and a network's quality level that is determined by packet delay variation (PDV) quality information of the timing packet received by said at least one slave from the potential masters, and
    wherein the master-slave quality level includes the master's quality level that is determined by AGNSS quality information of the potential masters with a first weight given thereto and the network's quality level that is determined by PDV quality information of the timing packet received by a specific slave from the potential masters with a second weight given thereto.

2. The clustering apparatus of claim 1, wherein the master's quality level includes a number of receivable AGNSS satellites, a strength of a signal received from the AGNSS satellites, and a number of satellites whose signal strength is higher than a reference signal strength.

3. The clustering apparatus of claim 1, wherein the processor is further configured to determine the network's quality level by filtering effective packets among timing packets obtained for a predetermined period of time, converting the effective packets into statistic levels, and converting the statistic levels into levels.

4. The clustering apparatus of claim 1, wherein the processor is further configured to determine a potential master that has the least number of slaves and is dependent upon the potential masters as the best master, when there exist several master-slave quality levels of the potential masters, the levels being the highest values and the same values.

5. The clustering apparatus of claim 1, wherein the is further to estimate the network's quality level by using PDV quality information measured between the master and each slave among one or more slaves connected to the same master.

6. A clustering method for controlling timing, the method comprising:
   receiving a neighbor list regarding potential master information for providing a timing packet from a server;
   determining a best master having a higher master-slave quality level based on the neighbor list and organizing a cluster having linkability between the best master and at least one slave; and
   performing synchronization between the best master and said at least one slave for each cluster,
   wherein the master-slave quality level includes a master's quality level that is determined by network assisted global navigation satellite system (AGNSS) quality information of the potential masters and a network's quality level that is determined by packet delay variation (PDV) quality information of the timing packet received by said at least one slave from the potential masters, and
   wherein the master-slave quality level includes the master's quality level that is determined by AGNSS quality information of the potential masters with a first weight given thereto and the network's quality level that is determined by PDV quality information of the timing packet received by a specific slave from the potential masters with a second weight given thereto.

7. The clustering method of claim 6, wherein the master's quality level includes the number of receivable AGNSS satellites, the strength of a signal received from the AGNSS satellites, and the number of satellites whose signal strength is higher than a reference signal strength.

8. The clustering method of claim 6, wherein the network's quality level is determined by filtering effective packets among timing packets obtained for a predetermined period of time, converting the effective packets into statistic levels, and converting the statistic levels into levels.

9. The clustering method of claim 6, further comprising:
   when there exist several master-slave quality levels of the potential masters, the levels being the highest values and the same values, determining a potential master that has the least number of slaves and is dependent upon the potential masters as the best master.

10. The clustering method of claim 6, further comprising: estimating the network's quality level by using PDV quality information measured between the master and each slave among one or more slaves connected to the same master.

* * * * *